United States Patent [19]

Adams

[11] Patent Number: 4,724,919

[45] Date of Patent: Feb. 16, 1988

[54] POWER ASSISTED VEHICLE STEERING SYSTEM

[75] Inventor: Frederick J. Adams, Clevedon, Great Britain

[73] Assignee: TRW Cam Gears Limited, Hitchin, United Kingdom

[21] Appl. No.: 830,707

[22] Filed: Feb. 18, 1986

[30] Foreign Application Priority Data

Feb. 20, 1985 [GB] United Kingdom ............... 8504373
Oct. 2, 1985 [GB] United Kingdom ............... 8524278
Oct. 2, 1985 [GB] United Kingdom ............... 8524279

[51] Int. Cl.⁴ .............................................. B62D 5/08
[52] U.S. Cl. .................................. 180/142; 137/117; 251/129.12
[58] Field of Search ............... 180/142, 143, 132; 137/117, 596.12; 251/129.12, 129.05, 129.07

[56] References Cited

U.S. PATENT DOCUMENTS

| | | | |
|---|---|---|---|
| 3,488,030 | 1/1970 | Hulme et al. | 251/129.12 |
| 3,882,954 | 5/1975 | Inoue | 180/143 |
| 4,153,021 | 5/1979 | Hattori | 251/129.12 X |
| 4,458,713 | 7/1984 | Wernberg | 137/117 |
| 4,463,930 | 8/1984 | Vamvakas | 251/129.12 |

FOREIGN PATENT DOCUMENTS

| | | | |
|---|---|---|---|
| 58-71262 | 4/1983 | Japan | 180/143 |
| 2039838 | 8/1980 | United Kingdom | 180/143 |

Primary Examiner—John J. Love
Assistant Examiner—Charles R. Watts
Attorney, Agent, or Firm—Tarolli, Sundheim & Covell

[57] ABSTRACT

A power assisted vehicle steering system has a rack and pinion steering gear 6 incorporating a servo motor 6a controlled by a valve 22. A fluid pressure supply line 3 to the valve 22 includes a throttle or regulating valve 5 which is adjustable by a stepping motor 30 that is speed responsive to increase incrementally the restriction by the valve 5 to fluid flow to the valve 22 as vehicle speed increases. A flow control valve 7 is responsive to fluid pressure in the line 3 upstream of the valve 5 and to fluid pressure in the line 3 downstream of the valve 5 so that a pressure differential across the valve 5 is sensed by spool 9 which is displaced to open the supply line 3 upstream of the valve 5 and a reservoir 1. This latter opening reduces the supply of pressure fluid available for actuating the servo motor 6a and the available power assistance as the vehicle speed increases.

5 Claims, 2 Drawing Figures

POWER ASSISTED VEHICLE STEERING SYSTEM

TECHNICAL FIELD AND BACKGROUND ART

This invention relates to a power assisted vehicle steering system. It has hitherto been proposed and is now recognised as a desirable feature of power assisted vehicle steering that the power assistance which is provided should decrease as vehicle speed increases and vice versa. By this proposal the steering system may provide very little or no power assistance when the vehicle is at high speed and full power assistance will be provided when the vehicle is at low speed, such as during a parking manoeuvre. Conventionally, a power assisted steering system has a steering gear, a fluid pressure operated servo motor device for the gear, a control valve controlling fluid pressure to the servo motor device in response to a steering manoeuvre whereby the servo motor responds to assist that manoeuvre, and a fluid pressure supply to the control valve, this supply usually being hydraulic fluid pressurised by a pump. A widely accepted manner of reducing power assistance as vehicle speed increases is to provide the control valve for the servo motor device with a means that is responsive to vehicle speed and reacts to increase the resistance of the control valve to operate in response to a steering manoeuvre as the vehicle speed increases—an example of this proposal is to be found in our G.B. Specification No. 1,456.901. By further proposals, as disclosed for example in Japanese Specification No. 58-71262 and G.B. Specification No. 2,014,795, the fluid pressure supply to the control valve is determined by a regulating or throttle valve which is responsive to vehicle speed whereby, for example, as disclosed in G.B. Specification No. 1,393,046 the fluid pressure within the servo motor is "drained off" to reduce the power assistance as vehicle speed increases. These prior proposed systems have suffered from problems of complexity, reliability, size and cost. More particularly, where the aforementioned regulating valve throttles the supply of fluid under pressure to the control valve under control of an electrical solenoid, the accuracy and consistency in adjustment of the regulating valve by a speed responsive solenoid leave much to be desired, particularly becuase the characteristics of a solenoid valve are frequently other than consistent. Also the operation of the solenoid valve may be impaired by pressure variations to which it is subjected from the fluid supply during its adjustment affected the characteristics required of the speed responsive solenoid control (for example where the speed responsive solenoid regulating valve is arranged as disclosed in G.B. Specification No. 2,014,795). It is an object of the present invention to alleviate the above mentioned disadvantages in the provision of a power assisted vehicle steering system of the kind generally discussed above.

STATEMENT OF INVENTION AND ADVANTAGES

According to the present invention there is provided a power assisted vehicle steering system which comprises a steering gear; fluid pressure operated servo motor means for said gear; a control valve controlling fluid supply for said servo motor means in response to a steering manoeuvre whereby said servo motor means responds to assist that manoeuvre; a fluid pressure supply to said control valve, the control valve being of the open centre type having a neutral condition in which the fluid pressure supply communicates through the valve with low pressure or reservoir; a regulating valve in the fluid pressure supply, the regulating valve being controlled by vehicle speed responsive means which reacts to adjust the regulating valve to decrease the flow of pressurised fluid to the control valve as vehicle speed increased and vice versa; a flow control valve which is responsive to a fluid pressure differential upstream and downstream of the regulating valve in the fluid pressure supply and reacts in response to a predetermined pressure differential to provide communication between the fluid pressure supply upstream of the regulating valve and low pressure or reservoir, and wherein the speed responsive means comprises an electrical stepping motor which is controlled in accordance with vehicle speed to incrementally adjust said regulating valve.

Stepping motors are well known in the electrical art as providing an output which will step consecutively, in one or the opposite direction, in accordance with signals received by the motor. Accordingly by the present invention it is envisaged that the motor output controls the throttling effect of the regulating valve dependent on vehicle speed so that as the vehicle speed progressively increases the motor steps consecutively to increase the restriction of fluid flow in the supply to the servo motor (and thereby reduce the available power assistance) and as the vehicle speed progressively decreases the motor steps in the opposite sense to decrease the restriction to fluid flow in the supply to the servo motor (and thereby increase the available power assistance). Stepping motors are relatively inexpensive and simply controlled, however in the context of the present invention they have the additional advantages of accurately and consistently controlling the adjustment of the regulating valve and, substantially, being unaffected in their characteristics by any feedback thereon which may result from pressure variations on the regulating valve during its adjustment in the fluid supply.

Generally a stepping motor provides a rotational output and conveniently this may be utilised directly (or through a gear system) to rotate, incrementally, a throttle member of the regulating valve in the fluid pressure supply so that such rotation appropriately opens or closes the fluid pressure supply to the servo motor means in accordance with vehicle speed. Alternatively the rotational output of the stepping motor may be converted, for example through a screw system, to provide incremental axial control of an axially displaceable throttle member of the regulating valve and which axial displacement varies the fluid pressure supply to the servo motor means as appropriate.

The flow control valve is preferably connected in parallel with the fluid pressure supply to bridge the regulating valve so that a displaceable member of the flow control valve is responsive to the pressure differential in the fluid pressure supply upstream and downstream of the regulating valve and that valve member is displaced in response to a predetermined pressure differential to open, or increase, communication between the fluid pressure supply upstream of the regulating valve and low pressure return or exhaust. Preferably the flow control valve responds to progressively open communication between the fluid pressure supply and the low pressure return or exhaust as aforementioned. The predetermined opening characteristics of the flow control valve may be determined, at least in part, by the preloading of that valve, for example by appropriate spring or other biasing means. It will be apparent from the aforegoing that as the regulating valve closes to reduce the fluid supply which is available to actuate the servo motor there will be an effective decrease in the power assistance available at that time. Simultaneously with the regulating valve closing, a pressure differential will develop across the flow control valve to open, or increase, the communication between the fluid supply upstream of the regulating valve and the low pressure return or reservoir so that a proportion of the fluid supply will be directed to the low pressure return or reservoir while the remaining proportion is directed through the regulating valve to be available to operate the servo motor means. This latter proportion is determined as necessary to provide the required characteristics of the servo motor means for the particular vehicle speed and characteristics of the regulating valve.

Further according to the present invention there is provided a power assisted vehicle steering system which comprises a steering gear; fluid pressure operated servo motor means for said gear; a control valve controlling fluid supply for said servo motor means in response to a steering manoeuvre whereby said servo motor means responds to assist that manoeuvre; a fluid pressure supply to said control valve, the control valve being of the open centre type having a neutral condition in which the fluid pressure supply communicates through the valve with low pressure or reservoir; a regulating valve in the fluid pressure supply, the regulating valve being controlled by vehicle speed responsive means which reacts to adjust the regulating valve to decrease the flow of pressurised fluid to the control valve as vehicle speed increases and vice versa; a flow control valve which is responsive to a fluid pressure differential upstream and downstream of the regulating valve in the fluid pressure supply and reacts in response to a predetermined pressure differential to provide communication between the fluid pressure supply upstream of the regulating valve and low pressure of reservoir, and wherein the regulating valve is arranged so that, during adjustment thereof, fluid pressure forces to which that valve is subjected from the fluid pressure supply are balanced with respect to the control of the valve by the speed responsive means whereby the adjustment of the regulating valve by the speed responsive means is substantially independent of fluid pressures in the fluid pressure supply. Both the regulating valve which controls the fluid pressure supply to the control valve of the servo motor and the control valve can be of very simple, reliable and compact construction such as spool valves; of particular note however is that by the further proposal the forces to which the regulating valve is subjected (during its adjustment) from fluid pressure in the supply are balanced with respect to the speed responsive control so that, unlike the proposal in G.B. No. 2,014,795, the adjustment of the regulating valve by the speed responsive means is achieved independently of the fluid pressure variations in the supply. Consequently the accuracy in the control afforded by the speed responsive means can be determined solely in accordance with the characteristics of that means. Preferably the regulating valve comprises a throttle member which is adjustable axially by the speed responsive means progressively to open or close the fluid pressure supply for the servo motor means as the vehicle speed progressively decreases or increases respectively, the throttle member having axially opposed faces which are subjected to fluid pressure in the fluid pressure supply during adjustment of the regulating valve and the fluid pressure on the opposed faces provide axially opposed faces to maintain the throttle member balanced axially with respect to the speed responsive means. The regulating valve (or the aforementioned throttle member thereof) is preferably controlled by a stepping motor. By use of a stepping motor to provide control of the regulating valve that valve can be adjusted incrementally and accurately consistent with successive steps of the motor as the vehicle speed increases or decreases.

DRAWING

One embodiment of a power assisted vehicle steering system constructed in accordance with the present invention will now be described, by way of example only, with reference to the accompanying illustrative drawings in which:

FIG. 1 diagrammatically shows the system applied with a conventional rack and pinion steering gear and utilising a rotational throttle member under control of the stepping motor in the regulating valve, and FIG. 2 shows a modification of the system in FIG. 1 utilizing an axially displaceable throttle member under control of the stepping motor in the regulating valve.

DETAILED DESCRIPTION OF DRAWINGS

Figure 1:
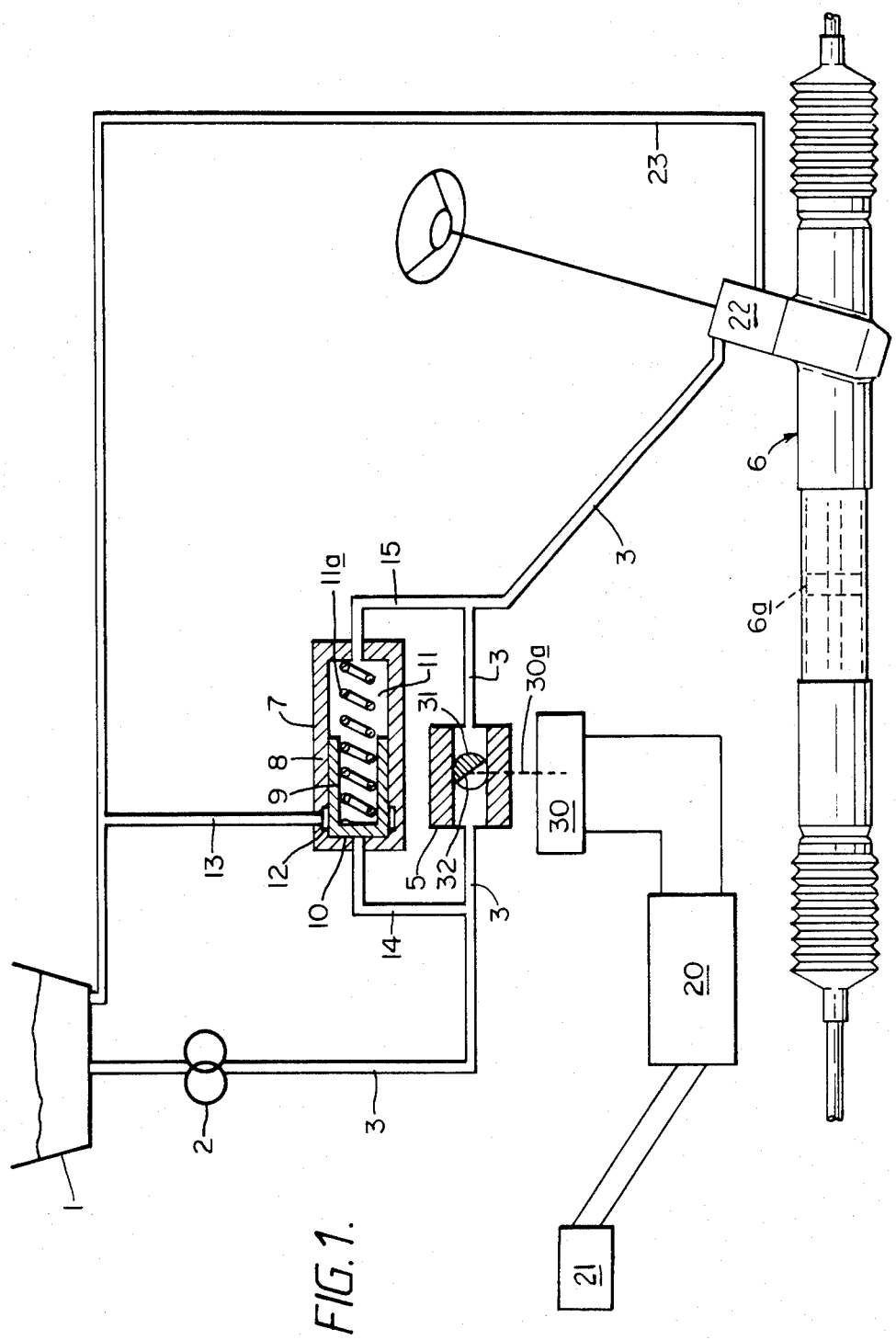

Hydraulic fluid from a reservoir 1 is pressurised by a pump 2 and directed by way of a supply conduit 3 to a control valve 22 of a rack and pinion steering gear 6. The gear 6 and control valve 22 may be of conventional type, the former having a double acting piston and cylinder type servo motor 6a to which hydraulic fluid is directed from the conduit 3 by the control valve 22 to provide assistance to the steering manoeuvre. The control valve 22 is of the open centre type having a neutral condition when a steering effort is not applied thereto in which the fluid pressure supply from conduit 3 is directed to a low pressure return conduit 23 which communicates with the reservoir 1. The control valve 22 will usually be of the rotary type having relatively rotatable valve components which are spring loaded relative to each other to be self centralising to the neutral condition as discussed, for example, in our G.B. Specifications Nos. 1,465,901 and 1,603,198.

Located in the supply conduit 3 is a regulating valve 5 comprising a rotatable throttle member 31 having a metering flat 32 in the conduit 3 so that rotation of the throttle member varies the restriction to the flow of hydraulic fluid through the supply conduit. The rotational displacement of the throttle member 31 is effected by an electrical stepping motor 30 through a rotational output link indicated at 30a. The motor 30 may be of a conventional type (as will be well known to persons skilled in the art) which rotationally drives the throttle member 31 incrementally in response to signals from a controller 20 to which it is connected. The controller 20 responds to signals from a sensor device 21 that is responsive to the speed of a vehicle within which the system is incorporated. In addition to vehicle speed, the sensor device 21 may be responsive to parameters other than vehicle speed such as lateral acceleration (which may be taken from the speed of rotation applied to effect a steering input through a steering wheel) and other characteristics which may affect the desirability for a variation in available power assistance at a particular instant. The controller 20 is arranged to control the throttle member 31 so that when the vehicle is stationary or slow moving the restriction by the regulating valve to fluid flow through the conduit 3 is at a minimum (thereby providing maximum fluid pressure supply to the control valve 22 for actuation of the servo motor 6a) and when the vehicle is at high speed the throttle member 31 is adjusted to provide a maximum restriction to fluid flow through the conduit 3 (thereby providing a minimum or no fluid pressure supply to the control valve 22 and minimum or no power assistance facility from the servo motor).

More particularly, in response to signals from the controller, the stepping motor 30 will rotate the throttle member in one or the opposite directions and through successive angular displacements or steps with considerable accuracy and consistency. In use the speed sensor device 21 and controller 20 will impart signals to the stepping motor 30 in accordance with vehicle speed to cause the motor to step and rotate the throttle member 31 to a position of the valve 5 which is predetermined for the prevailing vehicle speed. For example, if the vehicle is capable of 100 m.p.h. the controller 20 may cause the motor 30 to step successively and incrementally for each increase in vehicle speed of 10 m.p.h. so that the motor will have ten steps each step angularly and successively adjusting the orientation of the metering face 32 from a minimum restriction in the conduit 3 (possibly where the face 32 is parallel to fluid flow in the conduit 3) to a maximum restriction in the conduit 3 (possibly when the conduit 3 is closed by the metering face 32 as shown) to provide a variation in power assistance progressively and incrementally from full assistance to no assistance (and vice versa as the vehicle speed decreases).

Communicating with the supply conduit 3 to be responsive to a fluid pressure differential developed in the supply conduit upstream and downstream of the regulating valve 5 is a flow control valve 7. The valve 7 has a housing 8 within which is located a displaceable spool cup 9. Located in the housing 8 on one side of the cup 9 is a fluid chamber 10 and on the other side of the cup a spring chamber 11. A spring 11a is located in the chamber 11 to bias and preload the cup 9 in a sense which contracts the chamber 10. Displacement of the spool cup 9 in the housing 8 controls the opening and closing of an annular port 12 to a conduit 13 which communicates with the reservoir 1 by way of conduit 23. The chamber 10 communicates by way of a conduit 14 with the supply conduit 3 upstream of the regulating valve 5 and the spring chamber 11 communicates by way of a conduit 15 with the supply conduit 3 downstream of the regulating valve 5.

During use of the system as above described and with the vehicle stationary or at low speeds when maximum power assistance is required for a steering manoeuvre, the throttle member 31 will present the minimum restriction to the flow of fluid in the supply conduit 3. There will therefore be a negligible pressure differential between the upstream and downstream sides of the regulating valve 5 and as sensed through the conduits 14 and 15 so there will be little or no pressure differential on the spool cup 9 and the spool cup will be maintained by the spring 11a to close the port 12. Consequently, the output from pump 2 is directed solely through the conduit 3 to be available for providing power assistance by the servo motor 6a. As the speed of the vehicle increases the throttle member 31 controlled by the stepping motor is rotationally adjusted to close, incrementally, communication through the regulating valve 5 and thereby increase the restriction to flow of fluid through the supply conduit 3. This restriction to flow results in a pressure differential developing between the upstream and downstream sides of the regulating valve 5 in the supply conduit 3. As a consequence the spool cup 9 is subjected to a fluid pressure differential between the chambers 10 and 11; this will result in a pressure force on the cup 9 that progressively increases until it overcomes the biasing effect of the spring 11a and displaces the cup 9 against the spring biasing and opens the chamber 10 to communication with the low pressure return conduit 13. In this latter condition a proportion of the hydraulic fluid from the pump 2 by-passes the control valve 22 and is directed by way of conduits 14 and 13 back to the reservoir 1. The output of the pump 2 is preferably arranged to be constant irrespective of vehicle speed or vehicle engine speed, so that the reduction in the fluid which is available through the supply conduit 3 for actuating the servo motor will decrease as the restriction presented by the regulating valve 5 increases with the increase in vehicle speed and thereby there will be an effective reduction in the power assistance which is provided by the servo motor.

Figure 2:
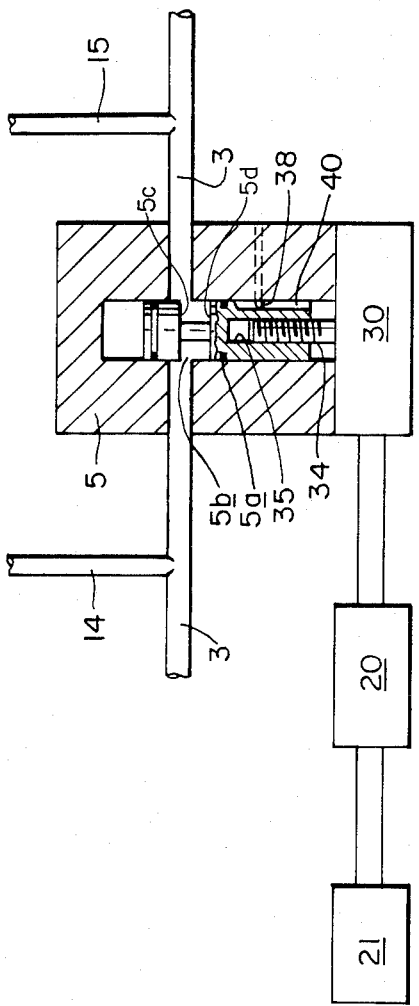

In the modification shown in FIG. 2 the regulating valve 5 comprises an axially displaceable spool 5a having an annular recess 5b which is adjustable relative to the conduit 3 to vary the restriction to the flow of hydraulic fluid through the supply conduit. It will be noted that the annular recess 5b of the spool has axially opposed faces 5c and 5d of equal area and that the throttling or variations in restriction to fluid flow by the valve 5 is effected solely through the recess 5b; accordingly the variations in fluid pressure from the supply conduit and on the spool 5a within the recess 5b are applied equally and oppositely to the aforementioned opposed faces so that the spool is balanced axially as regards the effect of fluid pressure thereon in the conduit 3. In response to signals from the controller 20, the stepping motor 30 rotates a screw spindle 34 in one or the opposite directions and through successive angular displacements or steps. The spindle 31 screw threadedly engages within an axially extending screw threaded blind bore 35 in an end of the spool 5a and the spool is restrained from rotating within its cylinder by a pin 38 in the valve housing which slidably engages within an axial track 40 in the cylindrical surface of the spool. Consequently when the motor 30 is stepped to rotate the spindle 34, the spool 5a will be driven axially and incrementally relative to its cylinder and in the appropriate direction with considerable accuracy to increase or decrease the restriction to fluid flow through the conduit 3 which is presented by the annular recess 5b in communicating with that conduit so that power assistance provided by the servo motor means 6a is varied in a similar manner to the embodiment of FIG. 1.

During the aforementioned axial displacement of the spool 5a to vary the restriction to fluid flow in the conduit 3, the effect of the pressure variations in the conduit 3 are balanced within the spool recess 5b as previously discussed; consequently the pressure variations in the conduit 3 are without effect on the control exhibited by the stepping motor 30 and on the spool 5a so that the accuracy and characteristics of that control are independent (to a practical extent) of pressure in the supply conduit 3.

I claim:

1. A power assisted vehicle steering system comprising:
   a steering gear;
   fluid pressure operated servo motor means for providing power for operating said steering gear;
   control valve means for controlling flow of pressurized fluid to said servo motor means in response to a steering maneuver to actuate said servo motor means;
   regulating valve means located in said fluid pressure conduit means for controlling flow of pressurized fluid to said control valve means in accordance with vehicle speed;
   vehicle speed responsive means for adjusting said regulating valve means in response to a change in the vehicle speed;
   said regulating valve means comprising a throttle member and said speed responsive means comprising means for axially adjusting said throttle member to control the flow of pressurized fluid to said servo motor means in accordance with the vehicle speed, said throttle member having opposed faces of equal area extending transverse to the axis of said throttle member and subjected to fluid pressure in said fluid pressure conduit means, the fluid pressure acting on said opposed faces providing axially opposed equal forces acting on said throttle member.

2. A system as claimed in claim 1 wherein said steering system comprises a flow control valve responsive to a fluid pressure differential across said regulating valve means for communicating pressurized fluid to a reservoir in response to a predetermined pressure differential across said regulating valve means.

3. A system as claimed in claim 1 further comprising an electrical system for controlling the adjustment of said regulating valve means, said electrical system comprising a vehicle speed sensor.

4. A system as claimed in claim 1 wherein said speed responsive means comprises an electrical stepping motor for incrementally adjusting said throttle member to control the flow of pressurized fluid to said servo motor means in accordance with vehicle speed.

5. A system as claimed in claim 4 wherein said system comprises means for restraining said throttle member from rotation about its axis, said throttle member has a threaded axial bore, and said stepping motor comprises a threaded output member engaging the threads of said threaded axial bore to effect axial adjustment of said throttle member in response to rotation of said threaded output member.

* * * * *